(12) United States Patent
Miura

(10) Patent No.: US 12,405,764 B2
(45) Date of Patent: Sep. 2, 2025

(54) INPUT DEVICE, CONTROL METHOD OF INPUT DEVICE, AND NON-TRANSITORY COMPUTER-READABLE STORAGE MEDIUM

(71) Applicant: YAMAHA CORPORATION, Hamamatsu (JP)

(72) Inventor: Yuji Miura, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 18/816,108

(22) Filed: Aug. 27, 2024

(65) Prior Publication Data

US 2025/0077164 A1 Mar. 6, 2025

(30) Foreign Application Priority Data

Aug. 28, 2023 (JP) ................. 2023-137933

(51) Int. Cl.
*G06F 3/16* (2006.01)
*G06F 3/02* (2006.01)

(52) U.S. Cl.
CPC .............. *G06F 3/16* (2013.01); *G06F 3/0202* (2013.01)

(58) Field of Classification Search
CPC ................. G06F 3/16; G06F 3/0202
See application file for complete search history.

(56) References Cited

U.S. PATENT DOCUMENTS

2012/0247307 A1* 10/2012 Nakagawa ............... G10H 1/46
84/622

FOREIGN PATENT DOCUMENTS

JP H06043867 A 2/1994

* cited by examiner

*Primary Examiner* — Priyank J Shah
(74) *Attorney, Agent, or Firm* — ROSSI, KIMMS & McDOWELL LLP

(57) ABSTRACT

An input device includes: a detection unit configured to detect, based on a detection value obtained by detecting an operation on a pressable portion, a note-on operation and a note-off operation; and a control unit configured to set, based on at least the detection value, a control state to a valid state in which an application of an aftertouch effect is valid or an invalid state in which the application of the aftertouch effect is invalid. The control unit is configured to generate a note-on event or a note-off event based on the detected note-on operation or the note-off operation, and generate an aftertouch-on event based on a detection value output during the valid state. The control unit is configured to generate the note-on event even in a case in which the note-on operation is detected based on the detection value output during the valid state.

14 Claims, 11 Drawing Sheets

INPUT DEVICE, CONTROL METHOD OF INPUT DEVICE, AND NON-TRANSITORY COMPUTER-READABLE STORAGE MEDIUM

CROSS-REFERENCE TO RELATED APPLICATIONS

This application is based on and claims priority under 35 USC 119 from Japanese Patent Application No. 2023-137933 filed on Aug. 28, 2023, the contents of which are incorporated herein by reference.

FIELD

The present disclosure relates to an input device, a control method of the input device, and a non-transitory computer-readable storage medium.

BACKGROUND

In related-art input devices including a pressable portion, there is an input device configured to apply an aftertouch effect. For example, in JPH06-043867A, when a level of a pressing signal exceeds a threshold value, an instruction to generate sound is issued. Thereafter, the aftertouch effect is applied to a sound being generated in accordance with a transition of the level of the pressing signal.

SUMMARY

However, in JPH06-043867A, in a state in which the aftertouch effect is applied, the instruction to generate sound is not issued even when the level of the pressing signal exceeds the threshold value. That is, even when a strong operation is performed while the aftertouch effect is being applied, the instruction to generate sound is not issued again.

An object of the present disclosure is to provide an input device that can generate a note-on event even when an operation is performed while an aftertouch effect is being applied.

An aspect of the present disclosure provides an input device including: at least one pressable portion; a sensor configured to output a detection value obtained by detecting a pressing operation on the at least one pressable portion; a memory storing computer-executable instructions; and a processor configured to execute the computer-executable instructions stored in the memory to implement: a detection unit configured to detect, based on the detection value, a note-on operation and a note-off operation; and a control unit configured to set, based on at least the detection value, a control state to a valid state in which an application of an aftertouch effect is valid or to an invalid state in which the application of the aftertouch effect is invalid, in which: the control unit is configured to generate a note-on event based on the detected note-on operation, generate a note-off event based on the detected note-off operation, and generate an aftertouch-on event based on the detection value output during the valid state in which the application of the aftertouch effect is valid; and the control unit is configured to generate the note-on event even in a case in which the note-on operation is detected based on the detection value output during the valid state in which the application of the aftertouch effect is valid.

According to an aspect of the present disclosure, it is possible to generate a note-on event even when an operation is performed while an aftertouch effect is being applied.

BRIEF DESCRIPTION OF DRAWINGS

The present disclosure will be described in detail based on the following without being limited thereto, wherein.

DETAILED DESCRIPTION

Hereinafter, embodiments of the present disclosure will be described with reference to the drawings.

First Embodiment

Figure 1:
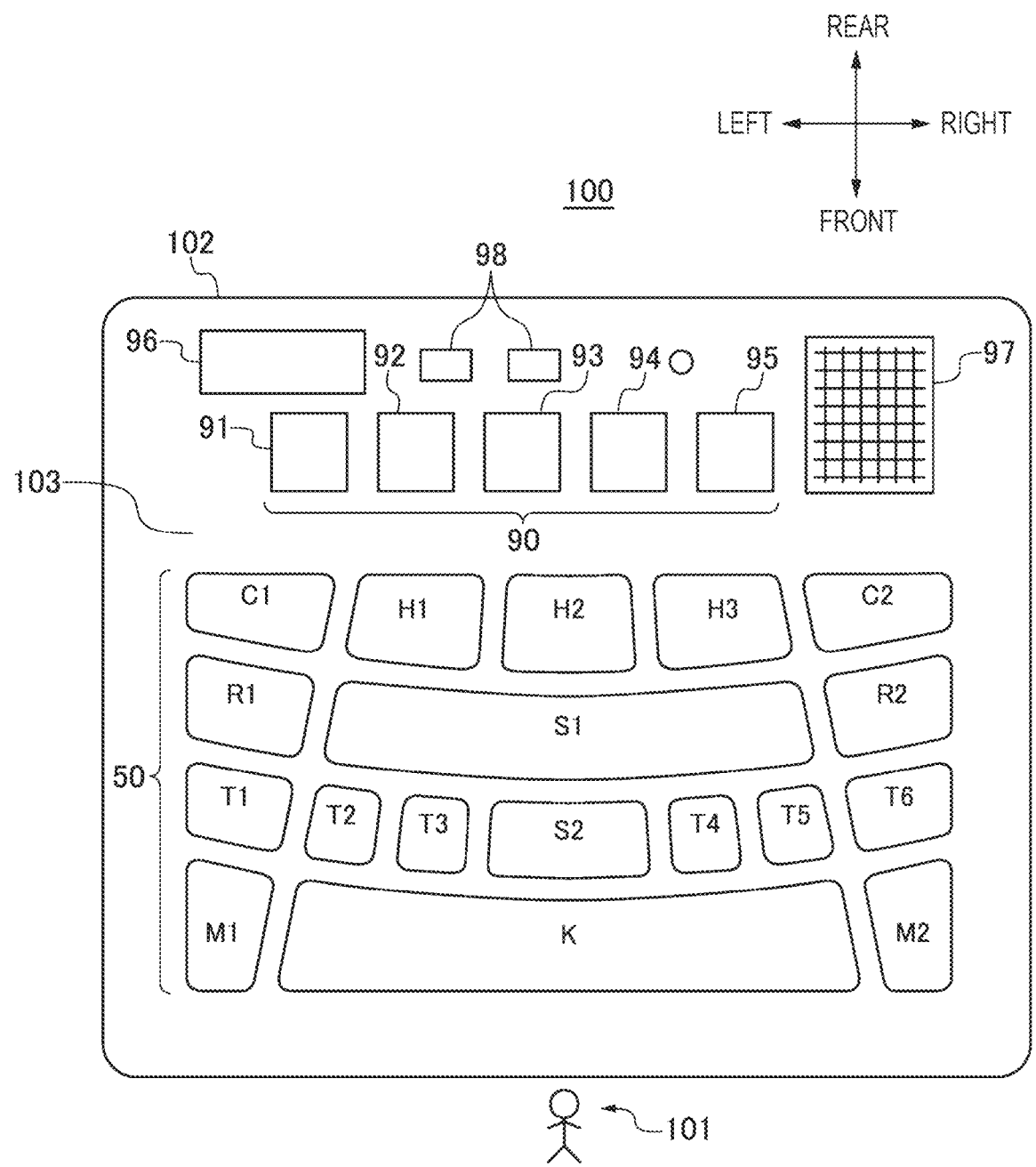
FIG. 1 is a plan view of an input device according to a first embodiment.

FIG. 1 is a plan view of an input device according to a first embodiment of the present disclosure. An input device 100 is an input device suitable for inputting a performance operation, and is implemented as an electronic musical instrument (electronic percussion instrument) as an example.

The input device 100 includes a housing 102. A panel 103 is provided on an upper surface of the housing 102. A pad operation unit 50, a setting operation unit 90, a display unit 96, and a speaker 97 are disposed on the panel 103. The setting operation unit 90 is an operator that receives various setting instructions and the like from a user 101. The setting operation unit 90 includes a menu button 91, a mode start/end button 92, a mode switching button 93, an another button 94, a determination button 95, and increase and decrease buttons 98.

The pad operation unit 50 includes a plurality of pressable portions (hereinafter, referred to as pads) operated by the user 101. It is assumed that the pad to be employed is one that is mainly operated by pressing or tapping. The plurality of pads included in the pad operation unit 50 include pads K, H1 to H3, C1, C2, S1, S2, R1, R2, M1, M2, and T1 to T6.

The user 101 usually uses the input device 100 at a position on a front side of the pad K, as shown in FIG. 1. Hereinafter, for the sake of convenience, the front side as viewed from the user 101 is defined as a front side, a back side is defined as a rear side, and a left-right direction is also based on the direction seen from the user 101.

Each pad is assigned an electronic sound tone, such as a drum (which may also include percussion) tone. The tone of the electronic sound that can be assigned is not limited. When the user 101 operates the pad, a sound of a tone corresponding to the pad is emitted from the speaker 97. Hereinafter, "operating a pad" is used synonymously with "pressing (pushing) or tapping a pad". The tone assigned to each pad can be changed. The tones assigned to certain pads may remain unchanged (fixed). As will be described later, an aftertouch effect is applied via the speaker 97 by an aftertouch operation.

Although each pad has a different shape, a basic configuration is common to one another. Each pad is a physical switch constituting an input area to be subjected to an input operation (performance operation).

Figure 2:
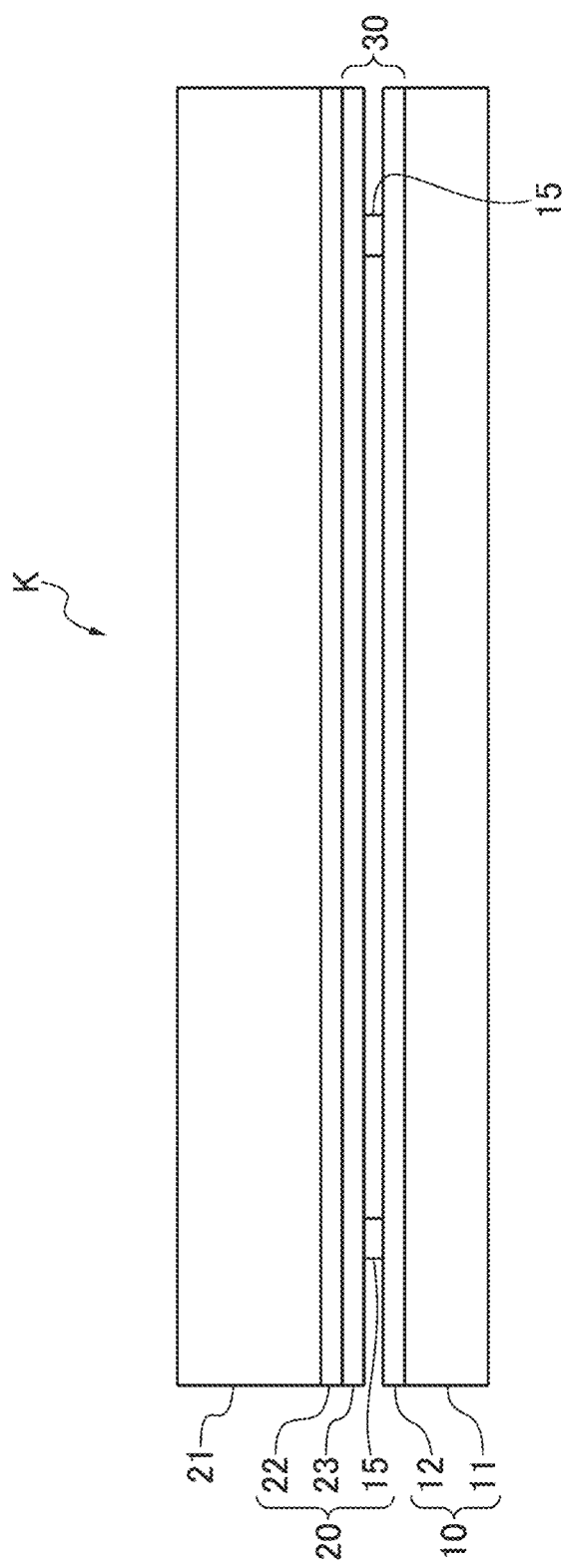
FIG. 2 is a schematic side view showing a sensor configuration of one pad.

FIG. 2 is a schematic side view showing a sensor configuration of one pad. Although FIG. 2 shows the sensor configuration of the pad K as a representative example, the sensor configuration is common to other pads.

In the pad K, a printed board 10, a conductive sheet 20, and a surface sheet 21 are disposed in this order from the bottom.

The surface sheet 21 constitutes a surface of the pad. The surface of the pad is flat and exposed from the panel 103. When performing the input operation, the user 101 may tap the pad with a finger. In order to alleviate an impact on the finger, for example, a rubber plate is employed as the surface sheet 21.

The printed board 10 has a board 11, and a gold plating pattern 12 is disposed on the board 11. The conductive sheet 20 is disposed below the surface sheet 21. The conductive sheet 20 has a film material 22 made of polyethylene terephthalate or the like, and a carbon pattern 23 is disposed under the film material 22. The conductive sheet 20 further includes insulating spacers 15, and the insulating spacers 15 are disposed under the carbon pattern 23. A sensor 30 (output unit) is formed by the gold plating pattern 12, the carbon pattern 23, and the spacers 15.

Any of the gold plating pattern 12 and the carbon pattern 23 is an example of a conductor, and another type of conductor may be employed. The spacer 15 may be provided as a part of the printed board 10, or may be provided independently of the conductive sheet 20 and the printed board 10.

Figure 3:
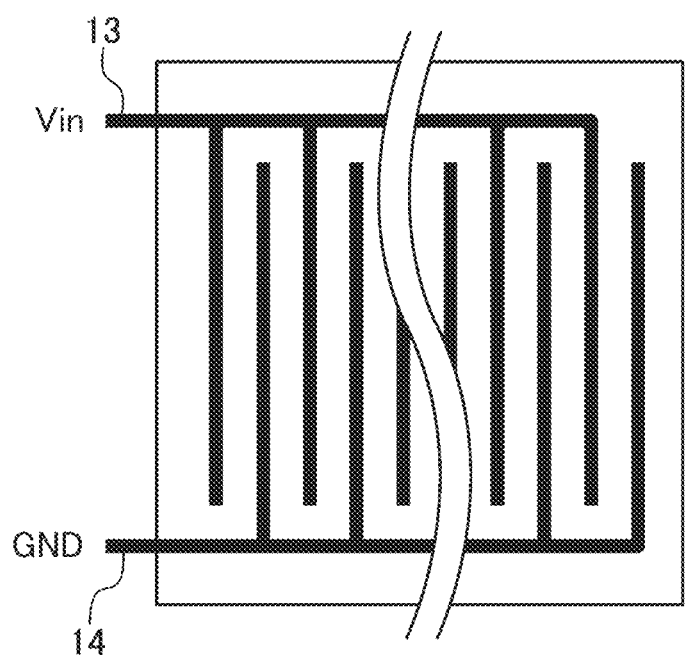
FIG. 3 is a schematic top view of a gold plating pattern.

FIG. 3 is a schematic top view of the gold plating pattern 12. The gold plating pattern 12 includes an input pattern 13 to which a voltage (Vin) is applied and a GND pattern 14 for ground (GND). The input pattern 13 and the GND pattern 14 are arranged in a comb shape. Since the spacer 15 is present, the input pattern 13 and the GND pattern 14 are not electrically connected in a non-operation state.

When the user 101 applies pressure from above by operating the surface sheet 21 with a finger (for example, tapping or pushing), the conductive sheet 20 is recessed between the spacers 15 and the carbon pattern 23 comes into contact with the gold plating pattern 12. Then, the input pattern 13 is electrically connected to the GND pattern 14. A voltage value changes in accordance with a contact area between the carbon pattern 23 and the gold plating pattern 12. The sensor 30 outputs the voltage value as a detection value at which an operation to the pad K is detected. The detection value continuously changes in accordance with a strength of the operation. Therefore, the presence or absence and the strength of the operation can be detected as a continuous amount based on the detection value.

The configuration of the sensor 30 is not limited to a sensor that detects a change in pressure applied to the pad, and may be a vibration sensor. Alternatively, the sensor may be a sensor that detects a displacement of the pad. It is not essential to detect the operation strength and the displacement of the pad with the continuous amount, and a sensor that outputs a value in a plurality of stages may be used.

Figure 4:
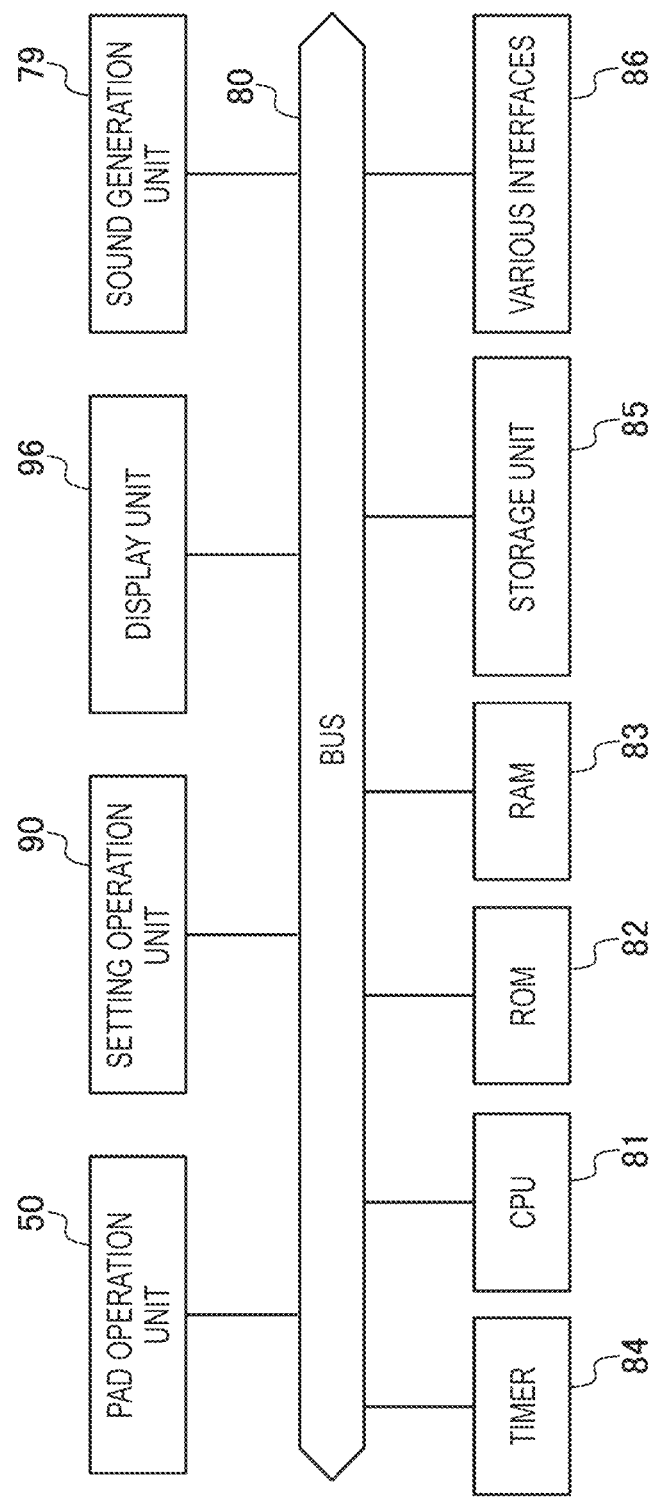
FIG. 4 is a block diagram of the input device.

FIG. 4 is a block diagram of the input device 100. Since the sensor 30 is provided for each pad, an output of the sensor 30 is performance information generated by operating the corresponding pad. The performance information generated by operating each pad in the pad operation unit 50 and operation information generated by operating each operator in the setting operation unit 90 are sent to a CPU 81 via a bus 80. The display unit 96 includes an LCD or the like, and displays various kinds of information according to an instruction from the CPU 81. In addition, a sound generation unit 79, a ROM 82, a RAM 83, a timer 84, a storage unit 85, and various I/Fs (interfaces) 86 are connected to the CPU 81 via the bus 80.

The CPU 81 controls the entire device. The ROM 82 stores a control program executed by the CPU 81 and various kinds of data. The RAM 83 provides a work area when the CPU 81 executes the control program. The storage unit 85 includes a nonvolatile memory and stores various kinds of information. The various I/Fs 86 may include not only a wired or wireless communication I/F but also a musical instrument digital interface (MIDI). The sound generation unit 79 includes a sound source circuit and an effect circuit (not shown) in addition to the speaker 97 (FIG. 1), and generates a sound based on the performance information generated by operating the pad.

Figure 5:
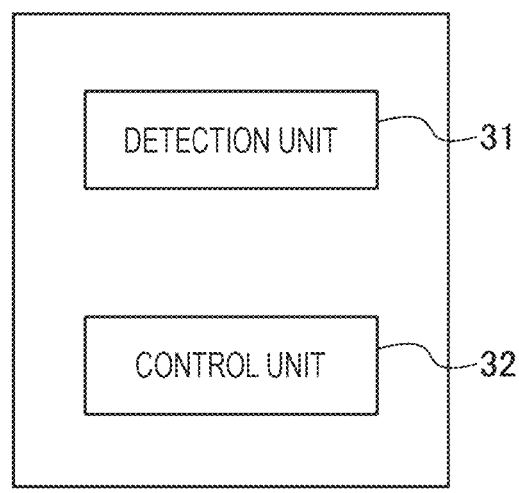
FIG. 5 is a functional block diagram for implementing a note process and an aftertouch process.

FIG. 5 is a functional block diagram for implementing a note process (to be described later in FIG. 7) and an aftertouch process (to be described later in FIG. 8). The functional block includes a detection unit 31 and a control unit 32. Functions of the detection unit 31 and the control unit 32 are implemented by cooperation of the CPU 81, the ROM 82, the RAM 83, the timer 84, the storage unit 85, and the like.

The detection unit 31 detects a note-on operation and a note-off operation based on the detection value obtained by detecting the operation on the pad. The control unit 32 sets, based on the detection value, a control state to a valid state in which an application of the aftertouch effect is valid and to an invalid state in which the application of the aftertouch effect is invalid. The control unit 32 generates a note-on event based on the detected note-on operation, generates a note-off event based on the detected note-off operation, and generates an aftertouch-on event based on the detection value output during the valid state. The control unit 32 also generates the note-on event when the note-on operation is detected based on the detection value output during the valid state.

Figure 6:
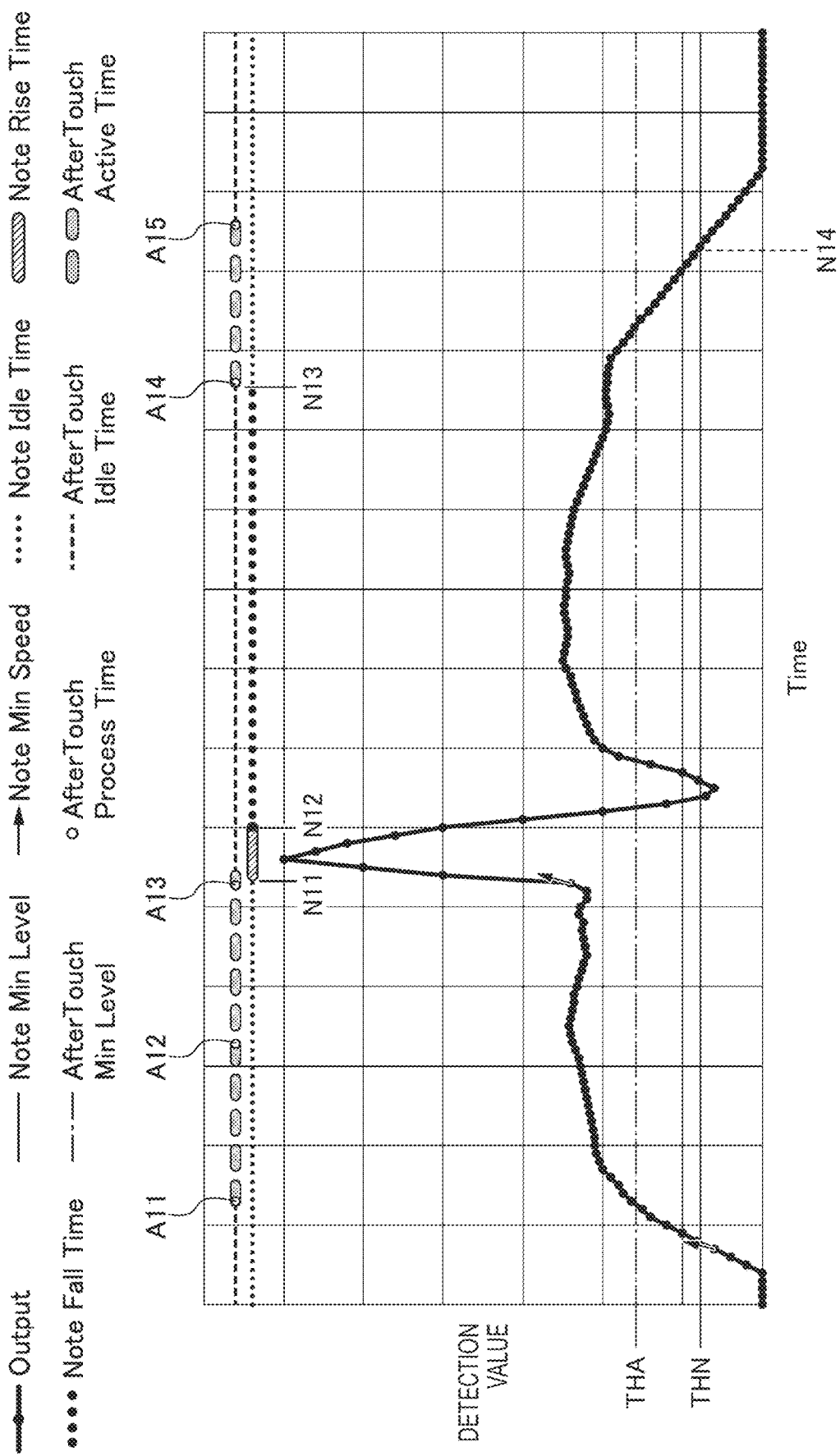
FIG. 6 is a diagram showing a control transition in the note process and the aftertouch process in a first mode.

FIG. 6 is a diagram showing a control transition in the note process (to be described later in FIG. 7) and the aftertouch process (to be described later in FIG. 8) in a first mode. The note process and the aftertouch process are executed in parallel. Details of the first mode, the note process, and the aftertouch process will be described later.

In FIG. 6, a horizontal axis represents an elapsed time (Time), and a vertical axis represents the detection value output from the sensor 30. FIG. 6 shows a process by which a certain pad changes from the non-operation state to an operation state and returns to the non-operation state. FIG. 6 shows that the larger the detection value, the more strongly (deeply) the pad is pressed.

In FIG. 6, the detection values obtained at timings of a control process related to notes are indicated by dots, and a curve connecting the dots shows a temporal change of the detection values. An aftertouch process time indicates an interval of the control process related to the aftertouch. The interval of the control process related to the notes is shorter than the aftertouch process time, and the intervals may be same.

FIG. 6 shows, as threshold values, a note threshold value THN (Note Min Level) (second threshold value) and an aftertouch threshold value THA (Aftertouch Min Level) (first threshold value). In the example, a magnitude relationship is THN<THA. The magnitude relationship may be THN=THA or THN>THA. In addition, as times, FIG. 6 also shows a note idle time, a note rise time, a note fall time, an aftertouch idle time, and an aftertouch active time.

Here, in the aftertouch idle times, a control state related to the aftertouch is the invalid state in which the application of the aftertouch effect is invalid. In the aftertouch active times, the control state related to the aftertouch is the valid state in which the application of the aftertouch effect is valid. A predetermined speed V1 (Note Min Speed) is a speed threshold value for determining the note-on operation.

The detection of the note-on operation and the note-off operation (determining that the note-on operation and the note-off operation are performed) is controlled as follows.

First, the detection unit 31 acquires the detection value output at each timing of the control process related to the note. The detection unit 31 may detect the note-on operation when the detection value exceeds the note threshold value THN. Alternatively, the detection unit 31 may detect an operation speed VS of the pad, and may detect the note-on operation when the operation speed VS exceeds the predetermined speed V1 (V1<VS). In this case, the detection unit 31 may detect the operation speed VS based on two or more detection values output at different timings. The two or more detection values here may be values that are temporally adjacent in detection order, or may be values that are not adjacent in detection order. The operation speed VS may be detected from an average or a weighted average of three or more detection values.

In the embodiment, the detection unit 31 detects the note-on operation by using both the note threshold value THN and the operation speed VS. For example, the detection unit 31 detects the operation speed VS of the pad by the above-described method, and detects the note-on operation when the operation speed VS exceeds the predetermined speed V1 in a state in which the detection value exceeds the note threshold value THN.

When the detection value is equal to or less than the note threshold value THN after the note-on operation is detected, the detection unit 31 detects the note-off operation. The threshold value for detecting the note-off operation and the threshold value for detecting the note-on operation may be separately provided.

The setting of the control state related to the aftertouch (which of the valid state and the invalid state is set) is controlled as follows.

First, the detection unit 31 acquires the detection value output at each timing of the control process related to the aftertouch. In principle, the control unit 32 sets the control state to the valid state when the detection value exceeds the aftertouch threshold value THA, and sets the control state to the invalid state when the detection value is equal to or less than the aftertouch threshold value THA. However, the control unit 32 does not shift the control state to the valid state even when the detection value exceeds the aftertouch threshold value THA during an aftertouch active shift prohibition time (predetermined time). Here, the "shift prohibition time" corresponds to the Note Rise Time and the Note Fall Time. Each of the note rise time and the note fall time is a time of a predetermined length. A note-on velocity is determined based on the detection value during the Note Rise Time. A method for determining the note-on velocity is not limited. One of the note rise time and the note fall time may be zero.

In the note process and the aftertouch process in the first mode, the note-on event, the note-off event, the aftertouch-on event, and an aftertouch-off event are generated as events. By outputting these events, start of sound generation and start of sound muting corresponding to the events are instructed, and sound generation and muting are controlled by a sound generation process (not shown). For example, in response to the output of the note-on event, a sound assigned to the operated pad is generated from the sound generation unit 79 at a volume corresponding to the note-on velocity. It is not essential to generate a sound based on the output of the note-on event, and a process other than the sound generation may be applied. For example, a choke (an effect that mutes a sound during the sound generation) or a control change (an effect that converts a note-on into a control change and outputs the control change) may be applied.

In addition, the aftertouch effect of the set type is applied in response to the output of the aftertouch-on event. Types of the settable aftertouch effect are not limited, and examples thereof include a note repeat (an effect of repeatedly generating a sound assigned to a pad at a predetermined interval in accordance with a tempo), a choke (an effect of muting a sound during the sound generation), a volume (an effect of changing a volume of a sound during the sound generation), and a control change (an effect of converting a note-on into a control change and outputting the control change).

Time points A11 to A15 are timings of the control process related to the aftertouch (reference numerals of certain timings are not shown).

The first mode is a process mode in which the note-on event is generated in response to detection of the note-on operation based on the detection value output during the valid state. The start of the first mode is instructed by an operation of the setting operation unit 90 (for example, the mode start/end button 92). The first mode may be started in response to activation of the input device 100. When the first mode is started, the note process and the aftertouch process are started, and first, the note idle time and the aftertouch idle time are reached.

At the time point A11, the detection value exceeding the aftertouch threshold value THA is acquired during the Note Idle Time (strictly speaking, the detection value exceeding the aftertouch threshold value THA is acquired at the timing of the control process related to the aftertouch during the Note Idle Time; the same applies hereinafter). Then, a shift is made to the aftertouch active time (valid state), and the aftertouch-on event corresponding to the detection value is generated and output. Thereafter, while the same state continues, the aftertouch-on event corresponding to the detection value is generated and output at each timing of the control process (for example, the time point A12).

During the aftertouch active time, when a detection value indicating the operation speed VS exceeding the predetermined speed V1 is acquired in a region exceeding the note threshold value THN, the note-on operation is detected. The aftertouch-off event is then generated and output. In response to this, the shift is made to the aftertouch idle time (invalid state) and the note rise time (time point A13 and time point N11).

When the note rise time elapses (time point N12), the note-on event is generated and output based on the detection value in the note rise time, and the shift is further made to the note fall time.

When the note fall time elapses (time point N13), the shift is made to the note idle time. When a detection value exceeding the aftertouch threshold value THA is acquired during the note idle time, the shift is made to the aftertouch active time (time point A14), and the aftertouch-on event corresponding to the detection value is generated and output. Thereafter, while the same state continues, the aftertouch-on event corresponding to the detection value is generated and output at each timing of the control process.

Thereafter, when a detection value equal to or less than the note threshold value THN is acquired, the note-off operation is detected (time point N14). When the note-off event is generated and output, the shift is made to the Note Idle Time. When a detection value equal to or less than the aftertouch threshold value THA is acquired during the aftertouch active time (time point A15), the aftertouch-off event is generated and output. In response to this, the shift is made to the aftertouch idle time.

Figure 7:
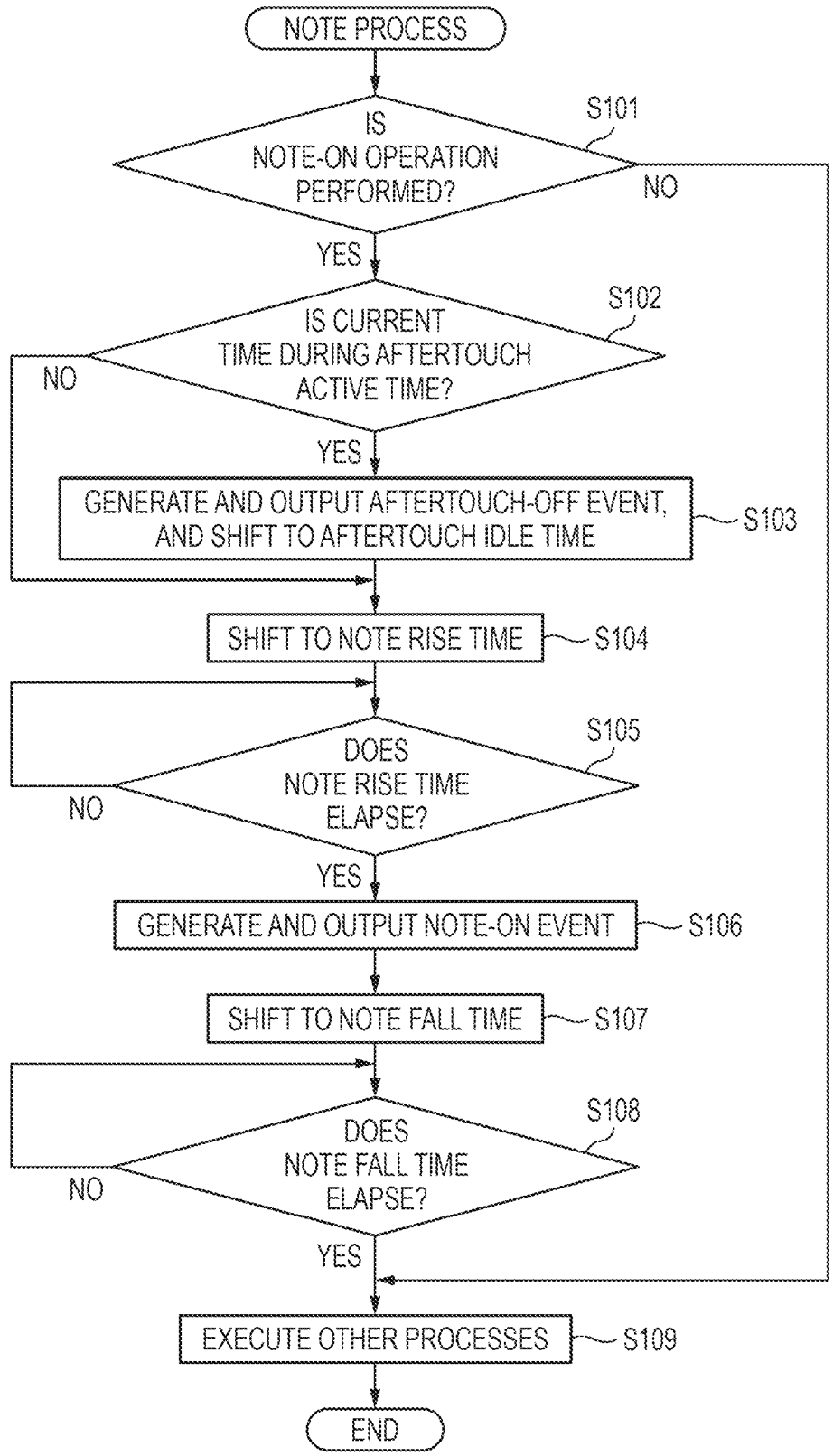
FIG. 7 is a flowchart of the note process.

FIG. 7 is a flowchart of the note process. FIG. 8 is a flowchart of the aftertouch process. The note process, the aftertouch process, and the sound generation process (not shown) are implemented by the CPU 81 loading and executing the program stored in the ROM 82 into the RAM 83. The note process, the aftertouch process, and the sound generation process are executed in parallel. The note process and the aftertouch process are started when the input device 100 is activated or when the start of the first mode is instructed, and thereafter, are periodically executed at respective processing intervals. When the input device 100 is stopped or the end of the first mode is instructed, the processes end. At the first start of the note process and the aftertouch process when the first mode is started, the note idle time and the aftertouch idle time are reached.

First, the note process will be described (FIG. 7). In step S101, the CPU 81 determines whether a note-on operation is performed. As described above, when the operation speed VS exceeds the predetermined speed V1 in a state in which the detection value exceeds the note threshold value THN, it is determined that the note-on operation is performed. A value of at least one of the note threshold value THN or the predetermined speed V1 may be set to be changed depending on whether it is during the aftertouch active time or the aftertouch idle time. When the CPU 81 does not determine that the note-on operation is performed, the process proceeds to step S109, and when the CPU 81 determines that the note-on operation is performed, the process proceeds to step S102.

In step S102, the CPU 81 determines whether a current time is during the aftertouch active time (the control state is the valid state). Then, when the CPU 81 determines that the current time is not during the aftertouch active time, the process proceeds to step S104, or when the current time is during the aftertouch active time, the process proceeds to step S104 after executing step S103.

In step S103, the CPU 81 generates an aftertouch-off event and outputs the generated aftertouch-off event. Further, the CPU 81 shifts the state to the aftertouch idle time (invalid state) (time point A13). In step S104, the CPU 81 shifts the state to the note rise time (time point N11).

In step S105, the CPU 81 waits until the note rise time elapses. During the note rise time, the CPU 81 monitors and stores a detection value. When the note rise time elapses, the CPU 81 proceeds to step S106. In step S106, the CPU 81 generates a note-on event based on the stored value, and outputs the generated note-on event. When the note-on event is output, a sound of an assigned tone is generated by the sound generation process.

Therefore, when the note-on operation is performed, the note-on event is generated not only during the aftertouch idle time but also during the aftertouch active time (S102 to S106). Moreover, when the note-on operation is performed during the aftertouch active time, the state is shifted to the aftertouch idle time (S102 to S103).

In step S107, the CPU 81 shifts the state to the note fall time (time point N12). In step S108, the CPU 81 waits until the note fall time elapses, and when the note fall time elapses (time point N13), the process proceeds to step S109.

In step S109, the CPU 81 executes other processes. Here, for example, a process of detecting the note-off operation and generating and outputting the note-off event when the note-off operation is performed is executed (time point N14). After step S109, the CPU 81 ends the note process (FIG. 7).

Figure 8:
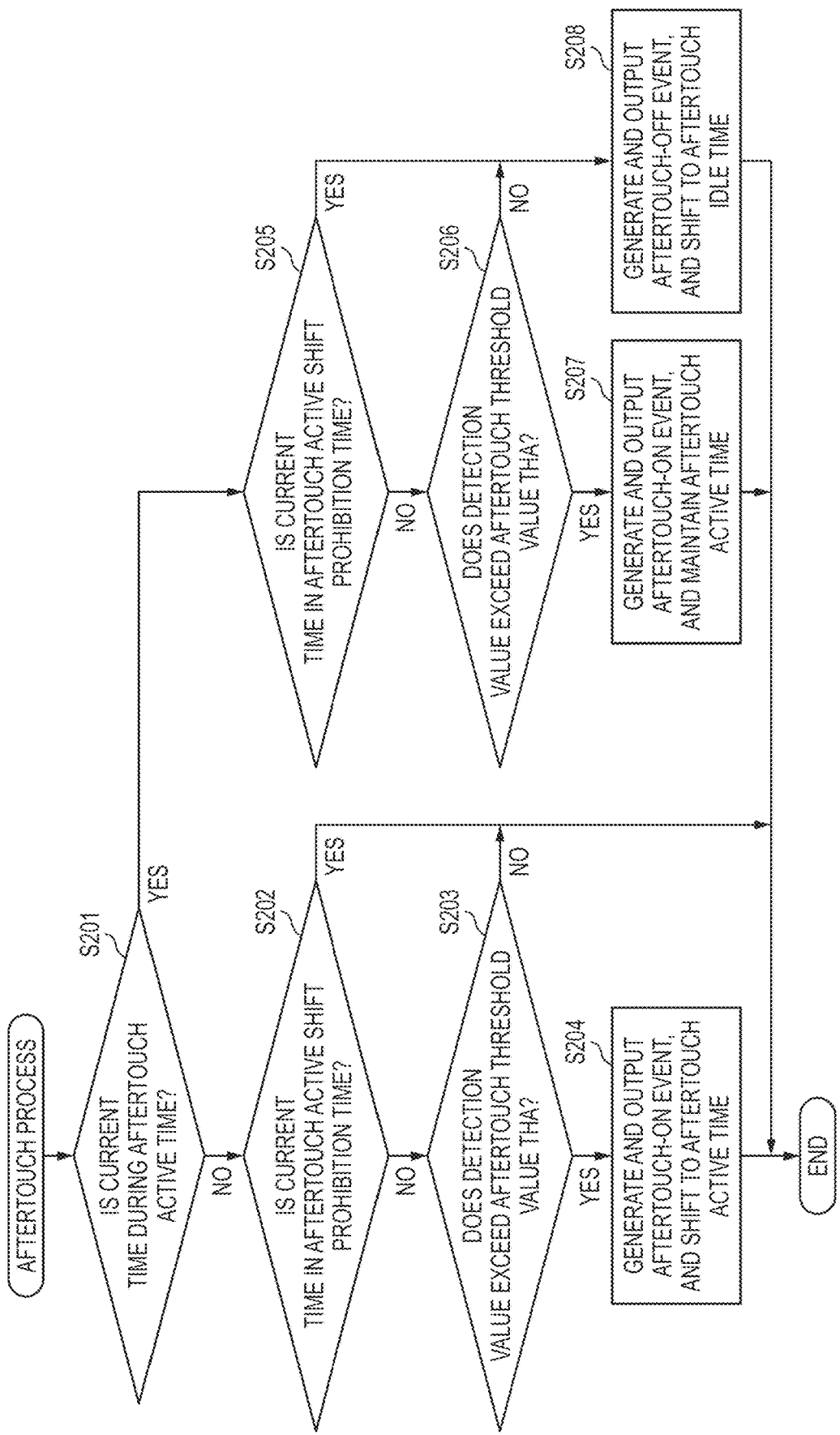
FIG. 8 is a flowchart of the aftertouch process.

Next, the aftertouch process will be described (FIG. 8). In step S201, the CPU 81 determines whether the current time is during the aftertouch active time. Then, when the CPU 81 determines that the current time is during the aftertouch active time, the process proceeds to step S205, and when the current time is not during the aftertouch active time, the process proceeds to step S202.

In step S202, the CPU 81 determines whether the current time is in an aftertouch active shift prohibition time (note rise time or note fall time). The CPU 81 ends the present process when the current time is in the shift prohibition time, and proceeds to step S203 when the current time is not in the shift prohibition time.

In step S203, the CPU 81 determines whether a detection value exceeding the aftertouch threshold value THA is acquired. The CPU 81 ends the present process when the detection value exceeding the aftertouch threshold value THA is not acquired, and proceeds to step S204 when the detection value exceeding the aftertouch threshold value THA is acquired.

In step S204, the CPU 81 generates an aftertouch-on event corresponding to the detection value, outputs the generated aftertouch-on event, and further shifts the state to the aftertouch active time (valid state) (time points A11 and A14). Thereafter, the CPU 81 ends the present process. When the aftertouch-on event is output, an aftertouch effect of an assigned type is applied by the sound generation process.

In step S205, the CPU 81 determines whether the current time is in the aftertouch active shift prohibition time. The CPU 81 proceeds to step S208 when the current time is in the shift prohibition time (time point N11, time point A13), and proceeds to step S206 when the current time is not in the shift prohibition time.

In step S206, the CPU 81 determines whether a detection value exceeding the aftertouch threshold value THA is acquired. The CPU 81 proceeds to step S208 (time point A15) when the detection value exceeding the aftertouch threshold value THA is not acquired, and proceeds to step S207 when the detection value exceeding the aftertouch threshold value THA is acquired.

In step S207, the CPU 81 generates an aftertouch-on event corresponding to the detection value, outputs the generated aftertouch-on event, and further maintains the aftertouch active time (time point A12). Therefore, during the aftertouch active time, the aftertouch effect is applied in response to acquisition of the detection value exceeding the aftertouch threshold value THA at each timing of the control process related to the aftertouch. Thereafter, the CPU 81 ends the present process.

In step S208, the CPU 81 generates the aftertouch-off event, outputs the generated aftertouch-off event, and further shifts the state to the aftertouch idle time. Thereafter, the CPU 81 ends the present process.

According to the embodiment, the control unit 32 generates the note-on event even when the note-on operation is detected based on the detection value output during the valid state (S102 to S103 to S106). Therefore, it is possible to generate the note-on event even the operation is performed while applying the aftertouch effect. In addition, a hitting sound can be generated by outputting the note-on event.

In particular, a horizontally elongated pad like the pad K is assumed to be operated using both hands. For example, there is known an input device that does not generate a hitting sound even if the same pad is operated with the right hand while the same pad is operated with the left hand and the aftertouch operation is performed. In contrast, in the embodiment, when the same pad is operated while the aftertouch operation is performed, the application of the aftertouch effect is interrupted and a hitting sound is generated. Therefore, various performance operations can be performed.

In response to the detection of the note-on operation based on the detection value output during the valid state, the control state is set to the invalid state, and the aftertouch-off event is generated (S103). Therefore, the hitting sound can be clearly generated without applying the aftertouch effect. After the control state is set to the invalid state, even if the detection value exceeds the aftertouch threshold value THA during the shift prohibition time, the control state is not shifted to the valid state (S202). Therefore, it is possible to start the application of the aftertouch effect at an appropriate timing.

Figure 9:
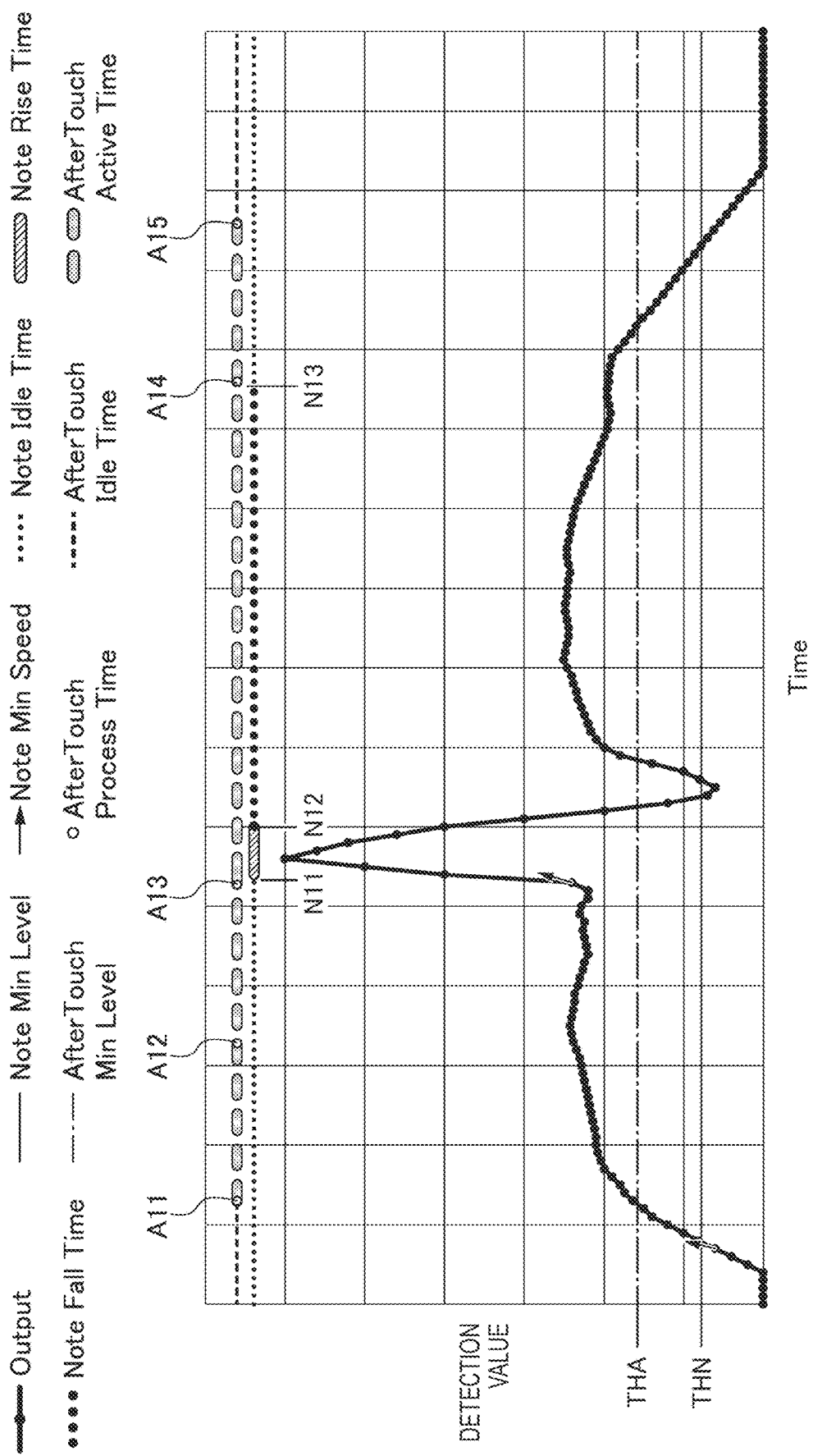
FIG. 9 is a diagram showing a control transition in a note process and an aftertouch process in a first mode of a modification.

A first mode of a modification shown in FIG. 9 may be used. FIG. 9 is a diagram showing a control transition in the note process and the aftertouch process in the first mode of the modification. The control transition shown in FIG. 9 is the same as the control transition shown in FIG. 6 except that a time from the time point A13 to the time point A14 becomes the aftertouch active time.

In the control transition shown in FIG. 6, the control state is set to the invalid state in response to the detection of the note-on operation based on the detection value output during the valid state (S103), and the control state is not shifted to the valid state during the shift prohibition time.

In contrast, in the first mode of the modification, the note process (FIG. 7) and the aftertouch process (FIG. 8) are independently controlled. However, steps S102 and S103 in FIG. 7 and step S202 and S205 in FIG. 8 are eliminated.

For example, the control unit 32 sets the control state to the valid state when the detection value exceeds the aftertouch threshold value THA, and sets the control state to the invalid state when the detection value is equal to or less than the aftertouch threshold value THA. The control unit 32 maintains the valid state even when the note-on operation is detected based on the detection value output during the valid state. Therefore, as shown in FIG. 9, the aftertouch active time is maintained between the time point A13 and the time point A14.

The mode is not limited to the first mode of the modification, and the valid state may be maintained even when the note-on operation is detected based on the detection value output during the valid state.

Second Embodiment

In the first embodiment, the sensor 30 is implemented to detect an operation strength and a displacement of the pad with a continuous amount. In contrast, in a second embodiment according to the present disclosure, from the viewpoint of simplifying a sensor configuration, a configuration in which the operation strength and the displacement of the pad are detected stepwise at a plurality of locations is employed. The displacement of the pad may be replaced with a stroke position.

Figure 10:
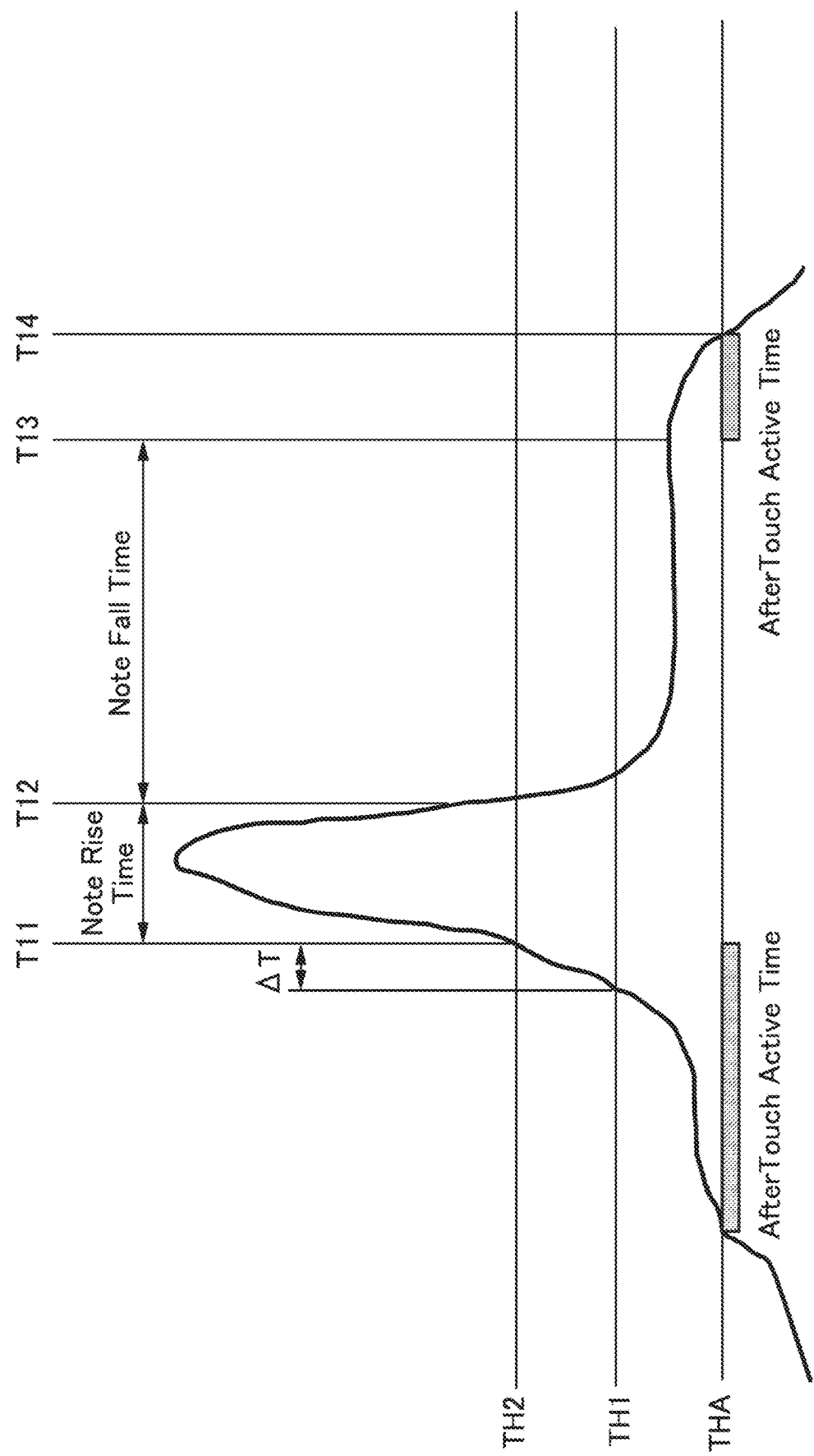
FIG. 10 is a diagram showing a control transition in a note process and an aftertouch process in a first mode according to a second embodiment.

FIG. 10 is a diagram showing a control transition in a note process and an aftertouch process in a first mode.

Although the configuration of the sensor to be employed is not shown, a known configuration such as an optical system may be employed. For example, as threshold values, in addition to the aftertouch threshold value THA, a three-make configuration using a note threshold value TH1 and a note threshold value TH2 is employed. A magnitude relationship is THA<TH1<TH2.

The basic control is the same as that shown in FIG. 6. As shown in FIG. 10, when the detection value exceeds the aftertouch threshold value THA, the control unit 32 shifts the state to the aftertouch active time (valid state). The control unit 32 determines a note-on velocity based on a time ΔT from when the detection value exceeds the note threshold value TH1 to when the detection value exceeds the note threshold value TH2. The control unit 32 shifts the state to the aftertouch idle time (invalid state) at a time point T11 when the detection value exceeds the note threshold value TH2. A time from the time point T11 to a time point T12 is the note rise time, and a time from the time point T12 to a time point T13 is the note fall time. When the note fall time ends, the control unit 32 shifts the state to the aftertouch active time (time point T13). When the detection value is equal to or less than the aftertouch threshold value THA, the control unit 32 shifts the state to the aftertouch idle time (invalid state) (time point T14).

As described above, the present disclosure can be implemented by using a sensor that detects the operation strength and the displacement of the pad at three locations.

In order to simplify the configuration, a sensor that detects the operation strength and the displacement of the pad at two locations may be used. In this case, for example, the aftertouch threshold value THA and the note threshold value TH1 may be used in common.

When a sensor that detects the operation strength and the displacement of the pad at four or more positions is used, two threshold values related to the aftertouch may be provided.

The first mode of the modification (FIG. 9) may be applied even when using a sensor that detects the operation strength or the displacement of the pad at a plurality of locations. That is, in FIG. 10, the aftertouch active time may be maintained between the time point T11 and the time point T13.

According to the embodiment, the effect same as that of the first embodiment can be achieved in relation to the generation of the note-on event even when an operation is performed while applying the aftertouch effect.

In the first and second embodiments, the first mode and a second mode different from the first mode may be switched and controlled. Switching of the process mode is instructed by, for example, the user 101 operating the mode switching button 93.

Figure 11:
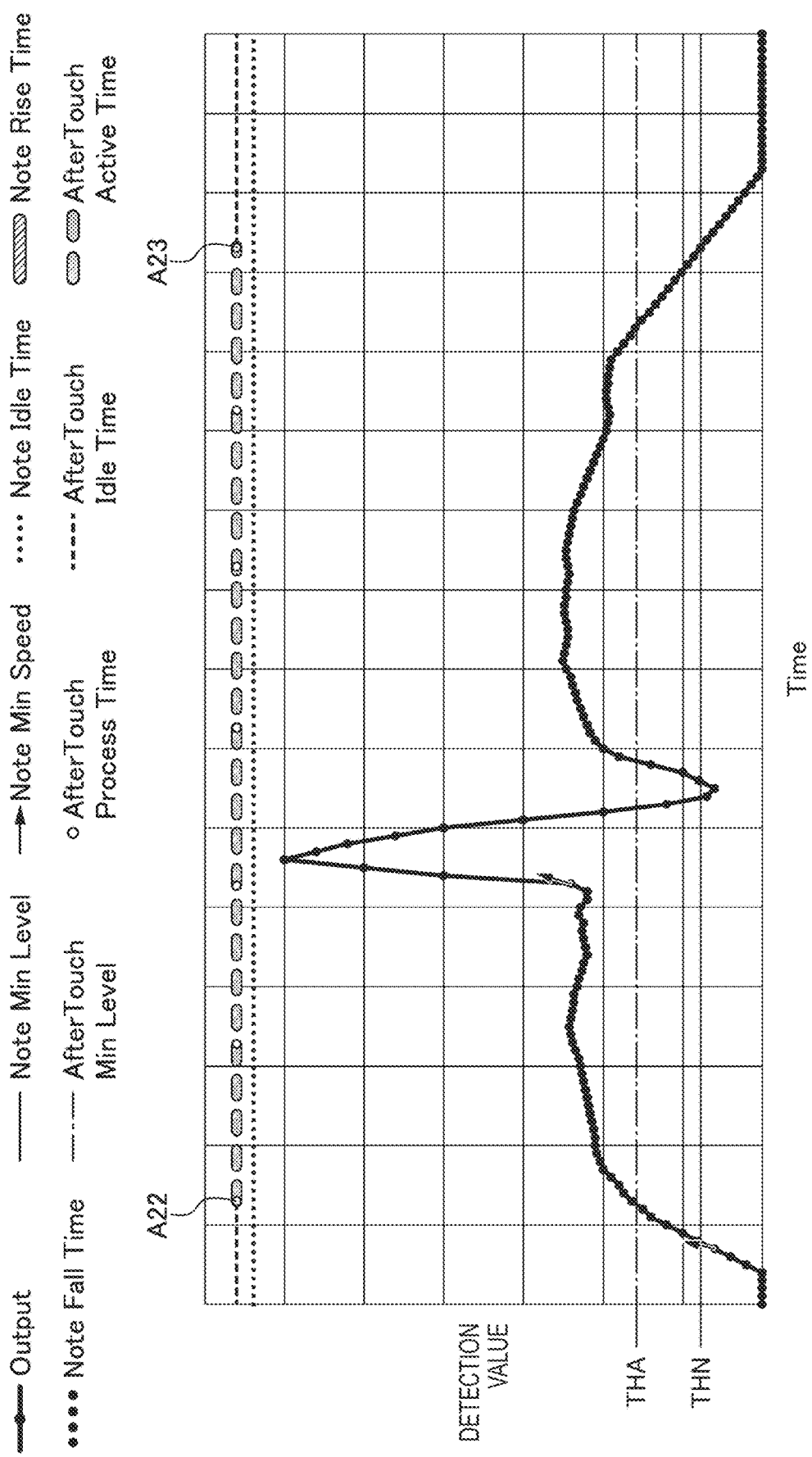
FIG. 11 is a diagram showing the control transition in the note process and the aftertouch process in a second mode.

FIG. 11 is a diagram showing the control transition in the note process and the aftertouch process in the second mode.

The first mode is a process mode in which a note-on event is generated in response to the detection of the note-on operation based on the detection value output during the valid state. The second mode is a process mode in which the note-on event is not generated even when the note-on operation is detected based on the detection value output during the valid state.

In the second mode, as shown in FIG. 11, at a time point A22, similarly to the time point A11 (FIG. 6), a detection value exceeding the aftertouch threshold value THA is acquired during the note idle time. Then, a shift is made to the aftertouch active time (valid state), and the aftertouch-on event corresponding to the detection value is generated and output.

Thereafter, from the time point A22 to a time point A23, the note idle time is maintained even during the aftertouch active time. That is, even when the note-on operation is detected therebetween, the note-on event is not generated.

At the time point A23, similarly to the time point A15 (FIG. 6), a detection value equal to or less than the aftertouch threshold value THA is acquired during the aftertouch active time. The aftertouch-off event is then generated and output. In response to this, the shift is made to the aftertouch idle time. The process at the time of detecting the note-off operation is the same as the control in the first mode (FIG. 6).

The switching between the first mode (FIG. 6) and the second mode (FIG. 11) is not limited, and the first mode of the modification (FIG. 9) and the second mode (FIG. 11) may be switchable. Alternatively, the first mode (FIG. 6) and the first mode of the modification (FIG. 9) may be switchable. Alternatively, the first mode (FIG. 6) and the first mode of the modification (FIG. 9) and the second mode (FIG. 11) may be switchable.

By making the mode switchable, various performance operations can be performed. A plurality of process modes that can be applied by the control unit 32 are not limited to the shown process modes.

A different process mode may be applied to each pad.

Alternatively, different process modes may be applied to each group of two or more pads. For example, one or more second pads are associated with the first pad in advance, and the second pads belong to the same group. Further, when applying a certain process mode to the first pad, the control unit 32 applies the same process mode to the second pad. The association for setting the group may be performed in accordance with a user instruction. For example, it is conceivable that pad groups that are adjacent within a predetermined range or pad groups to which the same type of sound is assigned are included in the same group.

It is not essential that the input device 100 has a sound generation function. Therefore, it is not essential for the control unit 32 to output each generated event and instruct generation of a sound. For example, the generated event may be stored in the storage unit 85 as data and then used for reproduction.

The pad in the input device 100 is a physical switch. However, the present disclosure can be applied to a virtual pad. For example, the pad operation unit 50 may be displayed on the display unit 96, and each pad may be implemented to be touch-operated. Alternatively, the pad operation unit 50 may be provided on a panel surface or the like of an electronic musical instrument.

In each of the above-described embodiments, the comparison between the detection value and the threshold values THN and THA may be read and applied as follows. "Exceeding the note threshold value THN", "exceeding the aftertouch threshold value THA", "equal to or less than the note threshold value THN", and "equal to or less than the aftertouch threshold value THA" may be read as "the note threshold value THN or more", "the aftertouch threshold value THA or more", "less than the note threshold value THN", and "less than the aftertouch threshold value THA", respectively. Similarly, "the operation speed VS exceeding the predetermined speed V1" may be read as "the operation speed VS being equal to or greater than the predetermined speed V1".

Although the present disclosure has been described in detail based on a preferred embodiment thereof, the present disclosure is not limited to the specific embodiment, and various forms without departing from the scope of the present invention are also included in the present disclosure. Some of the above-described embodiments may be appropriately combined.

A storage medium storing a control program represented by software for achieving the present disclosure may be read into the input device to achieve the effects same as that of the present disclosure. In this case, a program code itself read from the storage medium achieves a novel function of the present disclosure, and a non-transitory computer-readable recording medium storing the program code constitutes the present disclosure. The program code may be supplied via a transmission medium or the like, in which case the program code itself constitutes the present disclosure. In addition to the ROM, a floppy disk, a hard disk, an optical disk, a magneto-optical disk, a CD-ROM, a CD-R, a magnetic tape, a nonvolatile memory card, or the like may be used as the storage medium in such a case. The non-transitory computer-readable recording medium includes a medium that holds a program for a certain period of time, such as a volatile memory (for example, a dynamic random access memory (DRAM)) inside a computer system serving as a server or a client when a program is transmitted via a network such as the Internet or a communication line such as a telephone line.

What is claimed is:

1. An input device comprising:
at least one pressable portion;
a sensor configured to output a detection value obtained by detecting a pressing operation on the at least one pressable portion;
a memory storing computer-executable instructions; and
a processor configured to execute the computer-executable instructions stored in the memory to implement:
a detection unit configured to detect, based on the detection value, a note-on operation and a note-off operation; and
a control unit configured to set, based on at least the detection value, a control state to a valid state in which an application of an aftertouch effect is valid or to an invalid state in which the application of the aftertouch effect is invalid,
wherein the control unit is configured to generate a note-on event based on the detected note-on operation, generate a note-off event based on the detected note-off operation, and generate an aftertouch-on event based on the detection value output during the valid state in which the application of the aftertouch effect is valid, and
wherein the control unit is configured to generate the note-on event even in a case in which the note-on operation is detected based on the detection value output during the valid state in which the application of the aftertouch effect is valid.

2. The input device according to claim 1,
wherein the control unit is configured to set the control state to the invalid state in response to detection of the note-on operation based on the detection value output during the valid state.

3. The input device according to claim 2,
wherein the control unit is configured to not set the control state to the valid state until a predetermined time elapses after the control state is set to the invalid state in response to the detection of the note-on operation based on the detection value output during the valid state.

4. The input device according to claim 3,
wherein the control unit is configured to set the control state to the valid state in a case in which: the predetermined time elapses since the control state was set to the invalid state in response to the detection of the note-on operation based on the detection value output during the valid state; and the detection value exceeds a threshold value.

5. The input device according to claim 1,
wherein the control unit is configured to set the control state to the valid state in a case in which the detection value exceeds a threshold value, and set the control state to the invalid state in a case in which the detection value is equal to or less than the threshold value.

6. The input device according to claim 1,
wherein the control unit is configured to maintain the valid state in response to detection of the note-on operation based on the detection value output during the valid state.

7. The input device according to claim 1,
wherein the control unit is configured to operate in a first mode in which the note-on event is generated in response to detection of the note-on operation based on the detection value output during the valid state and in a second mode in which the note-on event is not generated in response to the detection of the note-on operation based on the detection value output during the valid state, and
the control unit is configured to switch operations between the first mode and the second mode.

8. The input device according to claim 1,
wherein the at least one pressable portion comprises a plurality of pressable portions,
wherein a process mode in which the note-on event is generated in response to detection of the note-on operation based on the detection value output during the valid state is one of a plurality of process modes that can be applied by the control unit, and
wherein the control unit is configured to apply different process modes for the plurality of pressable portions, respectively.

9. The input device according to claim 1,
wherein the at least one pressable portion comprises a plurality of pressable portions,
wherein a process mode in which the note-on event is generated in response to detection of the note-on operation based on the detection value output during the valid state is one of a plurality of process modes that can be applied by the control unit,
wherein one or more second pressable portions are associated with a first pressable portion among the plurality of pressable portions, and
wherein in a case in which a certain process mode is applied to the first pressable portion, the control unit is configured to apply a process mode identical with the certain process mode to the one or more second pressable portions.

10. The input device according to claim 1,
wherein the detection unit is configured to detect an operation speed of the pressable portion based on two or more detection values output at different timings from each other, and detect the note-on operation in a case in which the operation speed exceeds a predetermined speed in a state in which the detection value exceeds a threshold value.

11. The input device according to claim 1,
wherein the detection unit is configured to detect the note-on operation in a case in which the detection value exceeds a threshold value.

12. The input device according to claim 1,
wherein the detection unit is configured to detect an operation speed of the pressable portion based on two or more detection values output at different timings from each other, and detect the note-on operation in a case in which the operation speed exceeds a predetermined speed.

13. A control method, implemented by a computer, of an input device comprising a pressable portion, the control method comprising:
detecting a note-on operation and a note-off operation based on a detection value obtained by detecting a pressing operation on the pressable portion;
setting, based on at least the detection value, a control state to a valid state in which an application of an aftertouch effect is valid or to an invalid state in which the application of the aftertouch effect is invalid;
generating a note-on event based on the detected note-on operation, generating a note-off event based on the detected note-off operation, and generating an aftertouch-on event based on the detection value output during the valid state in which the application of the aftertouch effect is valid; and
generating the note-on event even in a case in which the note-on operation is detected based on the detection value output during the valid state in which the application of the aftertouch effect is valid.

14. A non-transitory computer readable storage medium storing a program for causing a computer to execute a control method of an input device comprising a pressable portion,
wherein the control method of the input device comprises:
detecting a note-on operation and a note-off operation based on a detection value obtained by detecting a pressing operation on the pressable portion;
setting, based on at least the detection value, a control state to a valid state in which an application of an aftertouch effect is valid or to an invalid state in which the application of the aftertouch effect is invalid;
generating a note-on event based on the detected note-on operation, generating a note-off event based on the detected note-off operation, and generating an aftertouch-on event based on the detection value output during the valid state in which the application of the aftertouch effect is valid; and
generating the note-on event even in a case in which the note-on operation is detected based on the detection value output during the valid state in which the application of the aftertouch effect is valid.

* * * * *